United States Patent
Roest et al.

(10) Patent No.: US 6,396,637 B2
(45) Date of Patent: May 28, 2002

(54) IMAGE DISPLAY DEVICE AND METHOD OF MANUFACTURING A LIGHT CONDUCTOR FOR SUCH AN IMAGE DISPLAY DEVICE

(75) Inventors: Wouter Roest; Helmar Van Santen, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/846,460

(22) Filed: May 1, 2001

(30) Foreign Application Priority Data

May 4, 2000 (EP) .............................. 00201619

(51) Int. Cl.[7] .............................................. G02B 27/10
(52) U.S. Cl. .................. 359/627; 359/630; 359/301; 359/483; 359/485; 359/487
(58) Field of Search .................................. 359/301, 302, 359/487, 627, 483, 485, 486, 630

(56) References Cited

U.S. PATENT DOCUMENTS

| 5,896,232 A | 4/1999 | Budd et al. ................ 359/630 |
| 5,965,247 A | 10/1999 | Jonza et al. ................ 428/212 |
| 5,982,540 A | * 11/1999 | Koike et al. ................ 359/487 |

\* cited by examiner

*Primary Examiner*—Hung Xuan Dang
*Assistant Examiner*—Tuyen Tra
(74) *Attorney, Agent, or Firm*—Gregory L. Thorne

(57) ABSTRACT

An image display device comprising a light modulation panel, a light conductor arranged opposite the light modulation panel and a light source connected to the light conductor. The light conductor comprises a serrated foil which reflects a light beam emitted by the light source and having a first direction of polarization, and transmits a light beam modulated by the light modulation panel and having a second direction of polarization.

9 Claims, 3 Drawing Sheets

Figure 1:
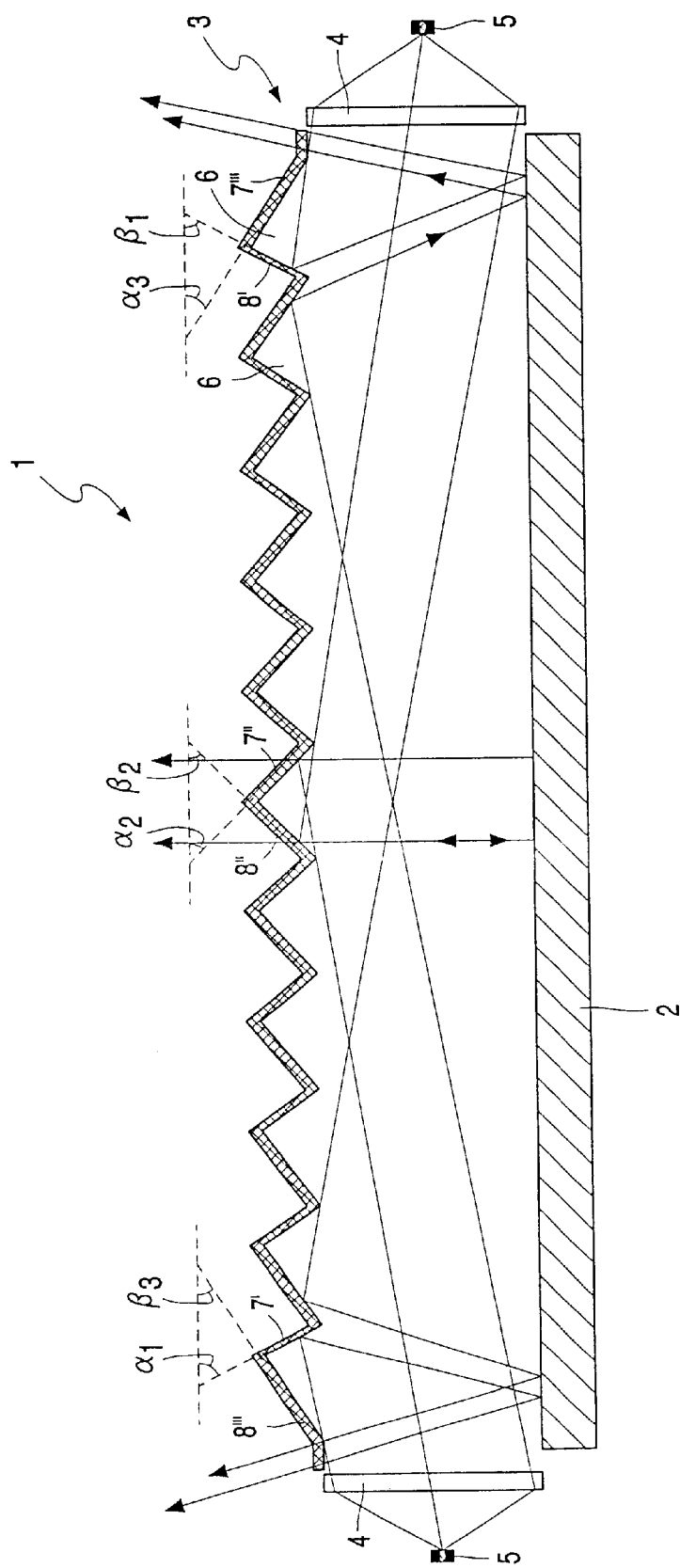

IMAGE DISPLAY DEVICE AND METHOD OF MANUFACTURING A LIGHT CONDUCTOR FOR SUCH AN IMAGE DISPLAY DEVICE

The invention relates to an image display device comprising a light modulation panel, a light conductor arranged opposite the light modulation panel, and a light source coupled to the light conductor.

The invention also relates to a method of manufacturing a light conductor for such an image display device.

The light conductor may be an optical element or may have an air gap.

In such an image display device, which is known from U.S. Pat. No. 5,896,232, the light conductor comprises a plurality of parallel extending elements reflecting light having a first direction of polarization and being transparent to light having a second direction of polarization. The image display device is used, inter alia, in head-mounted display devices (HMD) and projection televisions. LCDs which are either transparent or reflective are regularly used as light modulation panels. In a reflective LCD, the LCD is illuminated from the same side as the side from which it is viewed. Notably for HMDs, the light source and the associated light conductor should be as thin as possible so that the HMD can be given a relatively compact form. This has the advantage that a lens situated on a side of the light conductor remote from the light modulation panel is situated relatively close to the light conductor, which is favorable for achieving an optimal magnification.

In the image display device described in the above-mentioned United States patent, the light source is situated on a side of the light conductor remote from the light modulation panel. Consequently, a relatively compact structure cannot be obtained. Moreover, the manufacture of the light conductor is relatively complicated due to the different, parallel extending elements.

It is an object of the invention to provide an image display device in which the drawbacks mentioned above are obviated.

In the image display device according to the invention, this object is achieved in that the light conductor comprises a serrated foil which is reflective to a light beam emitted by the light source and having a first direction of polarization, and transparent to a light beam modulated by the light modulation panel and having a second direction of polarization.

The foil is, for example, a reflective polarizer which is made, inter alia, by 3 M and marketed under the name of "Dual Brightness Enhancement Film (DBEF)". A similar reflective polarizer is described in U.S. Pat. No. 5,965,247. The reflective polarizer foil may be folded to the desired serrated form by means of two mold parts which are movable with respect to each other. The mold parts may be subsequently removed or connected to the foil for forming an optical element in which the serrated foil is situated.

An embodiment of the image display device according to the invention is characterized in that the serrated foil has a plurality of juxtaposed sawtooth-shaped projections each comprising a first and a second face, a first face situated closer to the light source and facing the light source enclosing a larger angle with respect to the light modulation panel than a further first face situated further remote from the light source and facing the light source.

The angles enclosed by the first faces with respect to the light modulation panel can be chosen to be such that the light beams from the light source are incident on the foil at a desired angle of incidence, are subsequently directed onto the light modulation panel at a desired angle and then leave the serrated foil from the light modulation panel at a desired angle. Since the angle near the light source is larger than on a side remote from the light source, light beams reflected by the light modulation panel will diverge. As described above, a magnifying optical system, onto which the divergent light beams are directed, may be situated on a side of the serrated foil remote from the light modulation panel.

These and other aspects of the invention are apparent from and will be elucidated with reference to the embodiments described hereinafter.

Figure 2:
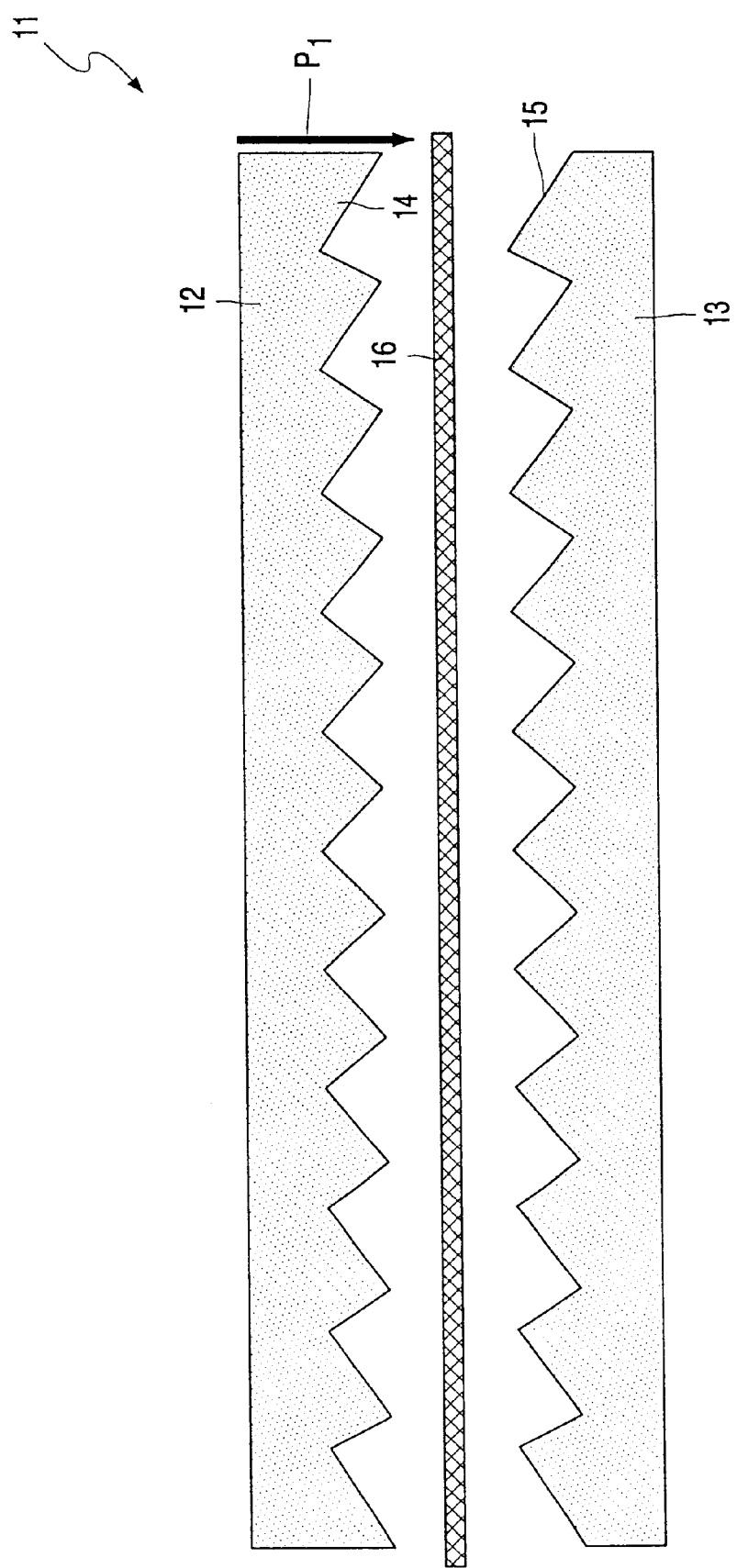
Figure 3:
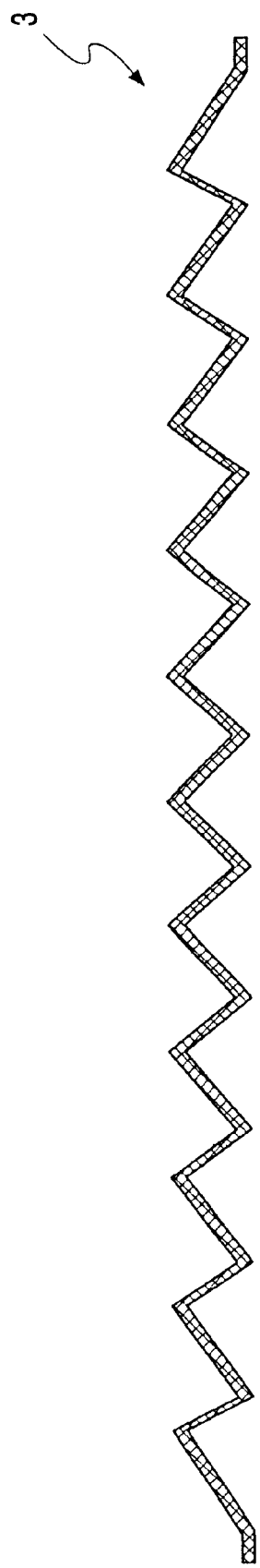

In the drawings:

FIG. 1 shows an embodiment of an image display device according to the invention, FIG. 2 shows a device for manufacturing a serrated foil, FIG. 3 shows a serrated foil.

Corresponding components in the Figures are denoted by the same reference numerals.

FIG. 1 shows an image display device 1 according to the invention, comprising a light modulation panel 2 such as, for example, a reflective LCD. The image display device 1 further comprises a serrated foil 3 spaced apart from the light modulation panel 2. Diffusion panels 4 extending transversely to the light modulation panel 2 are situated on both sides of the light modulation panel 2. At least a light source 5 is arranged opposite each diffusion panel 4 on a side remote from the light modulation panel 2. The light source 5 may be, for example, a light-emitting diode (LED) which emits red, green or blue light.

The serrated foil 3 comprises a plurality of projections 6 each being bounded by first faces 7 enclosing angles α with respect to the light modulation panel 2 and second faces 8 enclosing angles P with respect to the light modulation panel 2.

The first faces 7 are directed onto the light source 5 situated on the left-hand side of the light modulation panel 2 in FIG. 1, while a face 7' situated closer to the light source 5 encloses an angle $\alpha_1$ with respect to the light modulation panel 2, a face 7" situated proximate to the center of the light modulation panel 2 encloses an angle $\alpha_2$ with respect to the light modulation panel 2, while the face 7'" being most remote from the light source 5 encloses an angle $\alpha_3$ with respect to the light modulation panel 2. As the distance to the light source 5 increases, the angle α decreases, i.e. $\alpha_3 < \alpha_2 < \alpha_1$.

Similarly, the face 8' situated closer to the right-hand light source 5 encloses an angle $\beta_1$ with respect to the light modulation panel 2, which angle is larger than the angle $\beta_2$ enclosed by the face 8" situated proximate to the center of the light modulation panel 2 with respect to the light modulation panel 2. In its turn, the angle $\beta_2$ is larger than the angle $\beta_3$ enclosed by the face 8'" situated furthest away from the right-hand light source 5 with respect to the light modulation panel 2.

The serrated foil 3 is symmetrical, i.e. $\alpha_1 = \beta_1$; $\alpha_2 = \beta_2$; $\alpha_3 = \beta_3$.

The image display device 1 according to the invention operates as follows.

The foil 3 is reflective to the direction of polarization of the light beam from the light source 5, while it is transparent to the light beam coming from the light modulation panel 2 and having a changed direction of polarization. A light beam from the left-hand light source 5 will thus be deflected by one of the faces 7, dependent on the associated angle α, at a given angle in the direction of the light modulation panel 2. The light modulation panel 2 subsequently modulates the light beam and reverses its direction of polarization. The modulated light beam from the light modulation panel 2 subsequently passes unhindered through the serrated foil 3 in the direction of the optical system (not shown) situated opposite the serrated foil 3.

Since the angle $\alpha_1$ is larger than the angle $\alpha_3$ and the angle $\beta_1$ is larger than $\beta_3$, the light beams reflected proximate to the outer side of the light modulation panel 2 diverge.

FIG. 2 shows a device 11 which is suitable for manufacturing a serrated foil 3. The device 11 has two mold parts 12, 13 each having a sawtooth-shaped profile 14, 15. The mold part 12 is movable with respect to the mold part 13 in the direction indicated by arrow P1. Before the mold part 12 is moved towards the mold part 13, a flat reflective polarizer foil 16 is positioned between the mold parts 12, 13. By subsequently moving the mold part 12 in the direction indicated by arrow P1, the foil 16 is folded between the sawtooth-shaped profiles 14 and 15 so that the serrated foil 3 shown in FIG. 3 is formed.

The image display device 1 shown in FIG. 1 may be used in HMDs, fax viewers or mobile telephony, in watches, remote-control devices, mobile telephones, etc.

It is alternatively possible to use, instead of a reflective LCD, a DMD as a light modulation panel in which ¼λ foil is arranged between the DMD and the light source.

It is also possible to have equal angles throughout of the serrated foil or give the angles in the serrated foil a different variation.

It is also possible to manufacture the mold parts from two complementary optical elements in which the foil 3 is deformed in a sawtooth-shaped manner by means of the optical elements and simultaneously connected to the optical elements. The optical elements then constitute the mold and the support for the serrated foil.

The foil is, for example, 0.13 mm thick. After the provision of the sawtooth shape, the teeth have a height of, for example, 1 mm. The serrated foil 3 is situated at a distance of, for example, 4 to 5 mm from the light modulation panel 2.

What is claimed is:

1. An image display device comprising a light modulation panel, a light conductor situated opposite the light modulation panel, and a light source coupled to the light conductor, characterized in that the light conductor comprises a serrated foil which is reflective to a light beam emitted by the light source and having a first direction of polarization, and transparent to a light beam modulated by the light modulation panel and having a second direction of polarization.

2. An image display device as claimed in claim 1, characterized in that the serrated foil has a plurality of juxtaposed sawtooth-shaped projections each comprising a first and a second face, a first face situated closer to the light source and facing the light source enclosing a larger angle with respect to the light modulation panel than a first face situated further remote from the light source and facing the light source.

3. An image display device as claimed in claim 2, characterized in that the image display device comprises at least a second light source situated on a side of the light modulation panel remote from the first light source, in which a second face situated closer to the second light source and facing the second light source encloses a larger angle with respect to the light modulation panel than a second face situated further remote from the second light source and facing the second light source.

4. An image display device as claimed in any one of the preceding claims, characterized in that the serrated foil is connected on at least one side to a sawtooth-shaped, light-transmissive support.

5. An image display device as claimed in claim 3, characterized in that the foil is provided with the sawtooth-shaped projections by means of pressing between two facing mold parts.

6. An image display device as claimed in claim 5, characterized in that the mold parts constitute optical elements which are provided with complementary teeth, the foil being connected to the optical elements.

7. A method of manufacturing a light conductor suitable for an image display device as claimed in claim 6, characterized in that a foil is positioned between two sawtooth-shaped mold parts, whereafter the mold parts are moved towards each other, thus providing the foil with sawtooth-shaped projections.

8. A method as claimed in claim 7, characterized in that the foil is a reflective polarizer.

9. A method as claimed in claim 7 or 8, characterized in that the mold parts constitute optical elements, in which the foil is connected to the mold parts during the provision of the sawtooth-shaped projections by means of the mold parts.

* * * * *